April 9, 1963    L. A. WARD    3,085,235
POWER SUPPLY FOR BURGLAR OR FIRE ALARM
Filed Nov. 18, 1959
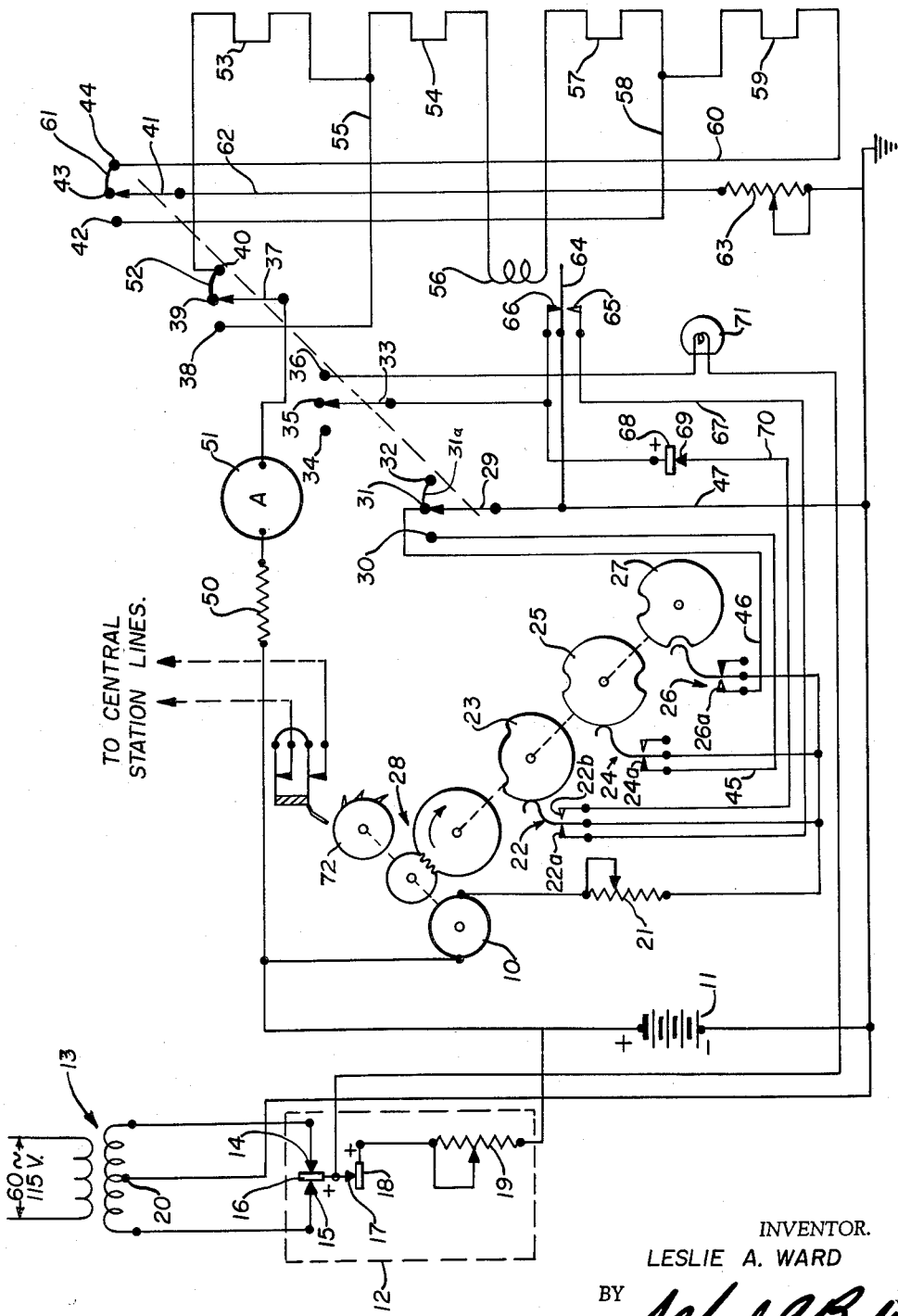
INVENTOR.
LESLIE A. WARD
BY
*Alfred C. Body*

United States Patent Office 3,085,235
Patented Apr. 9, 1963

3,085,235
POWER SUPPLY FOR BURGLAR OR FIRE ALARM
Leslie A. Ward, Cleveland, Ohio, assignor to Morse Signal Devices, Inc., Cleveland, Ohio, a corporation of Ohio
Filed Nov. 18, 1959, Ser. No. 853,728
2 Claims. (Cl. 340—293)

This invention relates to burglar or fire alarms of the remotely supervised type, in which one or more alarms are located at the premises to be protected and a remotely located supervisory central station is arranged to receive signals from such alarms. In particular, the present invention is directed to a novel and improved power supply for such a burglar or fire alarm.

One widely used alarm apparatus employed in such systems comprises an electric motor driving a mechanism which sends a distinctive coded signal over telephone wires to the supervisory central station. Heretofore, it has been conventional practice to energize the motor in the alarm apparatus from the usual A.C. power lines of the local electric utility. In the event of a power failure in such power lines, the apparatus operated to send a fault signal to the supervisory central station. In practice, this has meant that an investigator is sent out from the supervisory central station each time there is a power failure, even though the power failure may be of only very brief duration and the power will have been restored before the investigator reaches the site of the alarm apparatus which sent the signal. Since the fault signal might have been due to some cause other than power failure, such as tampering with the alarm by a burglar, it is necessary from the security standpoint to send out an investigator each time such a fault signal is received. Therefore, the occurrence of relatively brief power failures has resulted in the uneconomical use of the time of investigators sent out to check on fault signals.

The present invention is directed to a novel arrangement in such alarm apparatus which completely eliminates this difficulty. In accordance with the present invention, the signalling apparatus is operated by a D.C. motor energized by a permanent-type storage battery. The protective wiring in the alarm also is energized by this battery. By "permanent-type" storage battery as used herein is meant a nickel-cadmium battery or a battery having equivalent properties, particularly the property of an extremely long useful life as compared with conventional storage batteries. In the present invention the permanent-type battery is arranged to have a continuous floating charge from the usual A.C. power lines, the battery charging circuit being preset so that the charging rate is substantially greater than the normal drain on the battery. Consequently, in the event of a power failure in the A.C. power lines, the battery will continue to energize the protective wiring and to operate the motor as if no power failure had occurred. This condition will prevail for a period of several days, so that a fault signal will be sent out only in the extremely unlikely occurrence of an A.C. power failure extending over several days' time. Thus, the present invention completely eliminates the nuisance and unnecessary expense previously involved in such alarm systems when brief power failures occurred.

Accordingly, it is an object of this invention to provide a novel and improved power supply arrangement for a remotely supervised burglar or fire alarm.

It is also an object of this invention to provide such an arrangement which provides for continued operation of the alarm in the event of an electrical power failure.

Further objects and advantages of this invention will be apparent from the following detailed description of a presently-preferred embodiment thereof, which is illustrated schematically in the single FIGURE of the accompanying drawing.

Referring to the drawing, in the present invention the signalling apparatus at the alarm includes a six-volt D.C. electric motor 10. This motor is arranged to operate a suitable coded signal transmitter of known design. In the embodiment illustrated in the drawing, this coded signal transmitter operates substantially in accordance with the principles of my previous U.S. Patent No. 2,699,541, issued January 11, 1955. It is to be understood, however, that any other suitable motor-operated signal transmitter may be used in the present invention, if desired.

In accordance with the present invention, the motor 10 is connected to be energized by a six-volt permanent-type storage battery 11, which preferably is a nickel-cadmium battery. In one practical embodiment, this battery is rated at 6 volts, 0.5 ampere hours. The battery is designed to accept a maximum continuous charge of 40 milliamperes. Preferably, the battery is hermetically sealed and has a life expectancy which is virtually indefinite or, at any rate, longer than any of the other components in the alarm system.

The battery 11 is on a continuous floating charge through a charging circuit enclosed within the dotted-line box 12 in the drawing. The charging circuit 12 is connected across the secondary of a transformer 13. The primary of the transformer 13 is connected across the usual 60 cycle per second, 115 volt A.C. power lines common in most areas of this country. The turns ratio of the transformer is such that the voltage across its secondary is 16.5 volts.

The respective opposite ends of the transformer secondary are connected to a pair of negative terminals 14 and 15 of a conventional full-wave charging rectifier. The positive terminal 16 of the charging rectifier is connected directly to the negative terminal 17 of a blocking rectifier. The positive terminal 18 of the blocking rectifier is connected to a 150 ohm charging rate resistor 19. This resistor is adjustable so that the charging rate of the battery may be adjusted. The opposite end of resistor 19 is connected to the positive terminal of battery 11. The negative terminal of the battery is connected directly to ground.

The secondary of the transformer 13 is provided with a center tap 20 which is connected to ground.

The positive terminal of battery 11 is connected to one terminal of the D.C. motor 10. The opposite terminal of the motor is connected through an adjustable resistor 21 and a group of switches to the grounded negative terminal of the battery.

These switches include the following:

A transfer cam switch 22 is arranged to be operated by a transfer cam 23.

A day cam switch 24 is arranged to be operated by a day cam 25.

A night cam switch 26 is arranged to be operated by a night cam 27.

The respective cams 23, 25 and 27 are rotated in unison through reduction gearing 28 driven by the D.C. motor 10.

A four-section control switch is provided, made up of four switch units which are ganged together so as to be operated in unison. The first of these switch units comprises a movable contact member 29 and three spaced fixed contacts 30, 31 and 32. The second of these units comprises a movable contact member 33 and three spaced fixed contacts 34, 35 and 36. The third of these switch units comprises a movable contact member 37 and three spaced fixed contacts 38, 39 and 40. The fourth of these switch units comprises a movable contact member 41 and three spaced fixed contacts 42, 43 and 44.

In the second unit the middle and right-hand fixed contacts 31 and 32 are connected by a jumper 31a. In the third unit the middle and right-hand fixed contacts 39 and 40 are connected by a jumper 52. In the fourth unit a jumper 61 connects the middle and right-hand fixed contacts 43 and 44.

The fixed contacts of the respective units are so arranged with respect to the movable contacts that the movable contacts simultaneously engage the respective left-hand contacts 30, 34, 38 and 42, or they simultaneously engage the middle contacts 31, 35, 39 and 43, or they simultaneously engage the right hand contacts 32, 36, 40 and 44.

The day cam switch 24 is provided with a fixed left hand contact 24a which is connected through a line 45 to the left-hand fixed contact 30 associated with the movable contact 29 in the four-section control switch.

The night cam switch 26 is provided with a fixed, left-hand contact 26a which is connected through a line 46 to the middle fixed contact 31 of the same switch unit.

From the drawing, it will be apparent that when the movable contact of the night cam switch 26 engages the left-hand fixed contact 26a and the movable contacts of the four-section control switch are at the middle position, the motor 10 will be energized from the battery 11 as follows:

From the plus side of the battery through motor 10, resistor 21, switch 26, line 46, contacts 31 and 29 in the control switch and line 47 to the grounded negative terminal of the battery.

In like manner, the motor also is energized from the battery when the movable contact of the day cam switch 24 engages the left-hand fixed contact 24a and the movable contacts in the four-section control switch are to the left in the drawing. When this condition prevails, the energization circuit for the motor is completed through the day cam switch 24, line 45, contacts 30 and 29 in the control switch and line 47 to the grounded negative terminal of the battery 11.

With this arrangement, when the movable contacts of the four-section control switch are in the middle position, the energization of the motor 10 is, in part, under the control of the night cam 27, as described in detail hereinafter. Alternatively, when the movable contacts of the four-position control switch are to the left in the drawing, the energization of the motor 10 is, in part, under the control of the day cam 25. In either case the energization of the motor also is under the control of the transfer cam 23.

The battery 11 in the present invention also is arranged as to constitute the power supply for the protective wiring and the alarm relay in the alarm. Referring to the drawing, the positive side of the battery 11 is connected through a resistor 50 and an ammeter 51 to the movable contact 37 in the third unit of the four-section control switch. The middle and right-hand fixed contacts 39 and 40 of this switch unit are connected to each other through a jumper 52. The right hand fixed contact 40 is connected to one terminal of night protective wiring 53. The opposite terminal of this night protective wiring 53 is connected to one terminal of day protective wiring 54. This terminal of the day protective wiring 54 also is connected through line 55 to the left hand fixed contact 38 in the third unit of the four-section control switch.

The opposite terminal of the day protective wiring 54 is connected to one end of the coil 56 of the alarm relay. The opposite end of this coil is connected to one terminal of day protective wiring 57. The opposite terminal of this day protective wiring is connected through line 58 to the left-hand fixed contact 42 of the fourth unit in the four section control switch. This terminal of the day protective wiring 57 also is connected to one terminal of night protective wiring 59. The opposite terminal of this night protective wiring 59 is connected through line 60 to the right hand fixed contact 44 in the fourth unit of the four-section control switch.

The middle and right hand fixed contacts 43 and 44 in this fourth unit of the four-section control switch are connected together through a jumper 61. The movable contact 41 in this switch unit is connected through a line 62 and an adjustable resistor 63 to ground.

With this arrangement, when the four section control switch is in the "night" (middle) position, the protective wiring and the alarm relay coil 56 are energized as follows:

From the positive side of battery 11 through resistor 50, meter 51, control switch contacts 37 and 39, jumper 52, fixed contact 40, the night protective wiring 53, the day protective wiring 54, the alarm relay coil 56, the day protective wiring 57, the night protective wiring 59, line 60, control switch contact 44, jumper 61, control switch contacts 43 and 41, line 62, resistor 63 to the grounded negative terminal battery 11.

Alternatively, when the four section control switch is in the "day" (left hand) position, the alarm relay coil and the protective wiring are energized from the battery 11 as follows:

From the positive side of battery 11 through resistor 50, meter 51, control switch contacts 37 and 38, line 55, through the day protective wiring 54, the alarm relay coil 56 and the day protective wiring 57, line 58, the control switch contacts 42 and 41, and line 62 and resistor 63 to the grounded negative terminal of the battery. It will be noted that the night protective wiring 53 and 59 is not energized at this time.

From the foregoing, it will be apparent that, when the four section control switch is set for either "night" or "day" operation, the battery 11 will continuously energize the alarm relay coil 56 and a portion or all of the protective wiring.

The alarm relay is provided with a movable contact 64 which engages a lower fixed contact 65 when the relay coil 56 is de-energized and engages an upper fixed contact 66 when the alarm relay coil 56 is energized. The movable relay contact 64 is connected through line 47 to ground. The lower fixed contact 65 of the alarm relay is connected through line 67 to the left hand fixed contact 22a of the transfer cam switch 22. The upper fixed contact 66 of the alarm relay is connected to the movable contact 33 of the second unit of the four section control switch and to the positive terminal 68 of a blocking rectifier. The negative terminal 69 of this rectifier is connected through line 70 to the right hand fixed contact 22b of the transfer cam switch 22.

A test lamp 71 is provided which is connected between the right hand fixed contact 36 in the second unit of the four section control switch and the positive terminal 16 of the charging rectifier.

The signalling apparatus includes a code disc 72 driven by motor and arranged to send coded signals over telephone lines to the central supervisory station in a known manner.

In the operation of this apparatus, initially (i.e. with the motor 10 stopped) the cams 23, 25 and 27 are in the position shown in the drawing.

Assuming that the manually operated four-section control switch has been set to the "night" (middle) position, the following conditions prevail:

The night and day protective wiring 53, 54, 57 and 59 and the alarm relay coil 56 are energized continuously as follows: from the positive side of battery 11 through resistor 50, meter 51, switch contacts 37 and 39, jumper 52, switch contact 40, the night protective wiring 53, the day protective wiring 54, the alarm relay coil 56, the day protective wiring 57, the night protective wiring 59, line 60, switch contact 44, jumper 61, switch contacts 43 and 41, line 62 and resistor 63 to the grounded negative side of battery 11. Due to the energization of the alarm relay coil 56, the movable relay contact 64 engages the fixed relay contact 66. The motor 10 is de-energized at this time.

If a break or cross occurs in any of the protective wiring, such as might be caused by an intruder, this will break the energization circuit for the alarm relay coil 56, and the movable relay contact 64 will engage the fixed relay contact 65.

This completes an initial energization circuit for motor 10 as follows: from the positive side of battery 11 through the motor 10, resistor 21, the movable contact of transfer cam switch 22, fixed contact 22a, line 67, relay contacts 65 and 64, and line 47 to the grounded negative terminal of the battery.

Accordingly, with the motor started, the cams 23, 25 and 27 begin to turn clockwise in the drawing. The night cam 27 forces the movable contact of its switch 26 into engagement with the fixed contact 26a. This completes a holding circuit for motor 10 through these contacts and the contacts 31 and 29 in the first unit of the four-section control switch.

After the motor has run for about one round of the code disc 72 the transfer cam 23 will have turned sufficiently to permit the movable contact of switch 22 to disengage from the fixed contact 22a.

Following this, the motor stays energized through the holding circuit provided by the night cam switch 26. After three rounds of the code disc 72 the night cam 27 will have turned to a position where it permits the movable contact of its switch 26 to disengage from the fixed contact 26a. This breaks the holding circuit for the motor and the motor will stop. If the alarm relay coil 56 is again energized, the motor is again energized through the circuit provided by the movable contact of transfer cam switch 22, fixed contact 22b, line 70, rectifier 69, 68, and relay contacts 66 and 64. As the night cam begins to turn again, the movable contact of night cam switch 26 again engages the fixed contact 26a, completing a holding circuit for the motor. The motor operates the code disc 72 for one round. This is the "okay" signal. At the end of this signal the cams will have returned to the rest position shown in the drawing and the motor will be stopped.

When the proprietor of the premises where the alarm is located opens up in the morning, he is supposed to turn the four-section control switch to the "day" (left hand) position. This disconnects the night protective wiring 53 and 59 from the battery and leaves the day protective wiring 54 and 57 and the alarm relay coil 56 connected across the battery.

Also, the motor 10 is started, due to an energization circuit completed through the movable contact of day cam switch 24, fixed contact 24a, line 45 and contacts 30 and 29 in the first unit of the four-section control switch. The motor runs for one round of the code disc and then stops due to the disengagement of the movable contact in the day cam switch 24 from the fixed contact 24a.

Thereafter, in the event that the day protective wiring is either broken or crossed the apparatus will function to send two rounds of the coded signal to the central supervisory station, after which the motor 10 will stop.

When the day protective wiring is restored to normal, another two round coded signal will be sent, indicating restoration to normal.

It will be noted that, for both day and night operation of the alarm, the battery 11 provides the energization for both the motor 10 in the signal transmitter apparatus and the protective wiring.

The proprietor is supposed to operate the four-section control switch to the "test" (right hand) position at the end of the day. This connects the test lamp 71 to the power supply as follows: from the positive terminal 16 of the blocking rectifier, through lamp 71, switch contacts 36 and 33, relay contacts 66 and 64 to ground.

With this arrangement the test lamp 71 is used to determine whether or not there has been a failure of the A.C. power supply.

The test lamp 71 also performs the function of determining whether the alarm relay is operating properly. If it is not the energization circuit for the test lamp will be broken and the lamp will not light up. Also, if there is a break or cross in the protective wiring this will result in a failure of the test lamp 71 to light up.

The blocking rectifier 68, 69 is provided so that the fixed relay contact 66 may be used both for controlling the energization of motor 10 and for completing the energization circuit for test lamp 71.

Following the operation of the four-section control switch to the "test" position, this switch is on the "night" (middle) position until the proprietor returns the next morning and sets the switch to the "day" position.

In the operation of this invention, the resistor 19 is adjusted so that the charging rate of the battery 11 is 20 milliamperes, which is about seven times the normal load requirements on the battery. As a consequence, the battery will be sufficiently charged to maintain the normal operation of the motor 10 even in the event of A.C. power interruptions up to several days long. In actual practice, it has been found that the apparatus will continue to operate properly for seven days or longer while the A.C. power is off.

The successful operation of the present system depends in large measure upon the special characteristics of the "permanent-type" storage battery as compared with other types of storage batteries. The battery in the present invention has an extremely long life and is adapted to receive a virtually continuous floating charge without deteriorating. For these reasons, the battery itself imposes no serious limitation on the operating characteristics or useful life of the alarm, since the battery can be expected to operate properly at least as long as the other components of the apparatus. As already mentioned, a nickel-cadmium battery has been found to be ideal for this purpose.

It is to be understood that, while there has been described in detail herein and illustrated in the accompanying drawing a particular presently-preferred embodiment of this invention, various modifications, omissions and refinements which depart from the disclosed embodiment may be adopted without departing from the spirit and scope of this invention.

Having thus described my invention, I claim:

1. In an alarm adapted to be located on a premises to be protected and supervised at a point remote from said premises including a motor, a code wheel rotatably driven by said motor, an electric circuit connected to said remote supervisory point and adapted to transmit signals caused by rotation of said code wheel, a monitored detecting circuit on said premises, a power source for energizing said motor and said detecting circuit, control means in series with said detecting circuit and arranged to energize said motor upon a fault in said detecting circuit, the improvement comprising: said motor being a D.C. motor and said power source including a transformer having a primary winding adapted to be connected to the A.C. power means on said premises and a secondary winding, a first rectifier means having an input connected to said secondary winding and an output, a permanent type storage battery connected across said output of said first rectifier, the output of said first rectifier being further connected to said detecting circuit to energize same, said output of said first rectifier being periodically connected to said D.C. motor by said control means for sending a code signal through said electric circuit to said remote supervisory point, and a testing device for indicating failure of said A.C. power means and said detecting circuit, said device comprising, an alarm means, a testing circuit for connecting said alarm means to one of said transformer windings, a circuit breaker in said testing circuit, means for closing said circuit breaker only when said monitored detecting circuit is electrically de-energized, and blocking means for electrically isolating said testing circuit from said battery at all times.

2. The improvement as defined in claim 1 wherein said blocking means comprises a second rectifier between said battery and said first rectifier and means for connecting said testing circuit to said first rectifier on the side of said second rectifier remote from battery.

References Cited in the file of this patent

UNITED STATES PATENTS

| | | |
|---|---|---|
| 1,309,364 | Miller | July 8, 1919 |
| 1,867,834 | Hopkins | July 19, 1932 |
| 2,074,261 | Grant | Mar. 16, 1937 |
| 2,699,541 | Ward | Jan. 11, 1955 |
| 2,847,179 | Payzer | Aug. 12, 1958 |